(12) United States Patent
Konchin et al.

(10) Patent No.: US 6,756,892 B2
(45) Date of Patent: Jun. 29, 2004

(54) TIRE PRESSURE SENSING SYSTEM

(75) Inventors: Boris Konchin, Huntsville (CA);
Darrell F. Greene, Huntsville (CA);
Michael Landers, Bloomfield Hills, MI (US); Darrin Howse, Pickering (CA); Vladimir Dudarev, Kearney (CA)

(73) Assignee: Algonquin Scientific, LLC, Troy, MI (US)

(*) Notice: Subject to any disclaimer, the term of this patent is extended or adjusted under 35 U.S.C. 154(b) by 0 days.

(21) Appl. No.: 10/165,189

(22) Filed: Jun. 7, 2002

(65) Prior Publication Data

US 2003/0006894 A1 Jan. 9, 2003

Related U.S. Application Data

(63) Continuation-in-part of application No. 10/044,806, filed on Jan. 10, 2002, which is a continuation-in-part of application No. 09/430,595, filed on Oct. 29, 1999, now Pat. No. 6,362,732, which is a continuation-in-part of application No. 09/079,375, filed on May 15, 1998, now Pat. No. 6,124,787, which is a continuation-in-part of application No. 08/782,430, filed on Jan. 15, 1997, now Pat. No. 5,790,016.

(51) Int. Cl.$^7$ .............................................. B60C 23/00
(52) U.S. Cl. ..................................... 340/447; 340/442
(58) Field of Search ............................... 340/442, 444, 340/445, 446, 447, 448; 73/146.5, 714, 146.2, 146.4

(56) References Cited

U.S. PATENT DOCUMENTS

| | | | |
|---|---|---|---|
| 3,602,884 A | 8/1971 | Brumbelow | 340/448 |
| 3,807,226 A | 4/1974 | Williams | 374/4 |
| 3,810,090 A | * 5/1974 | Davis, Jr. et al. | 340/447 |
| 3,858,174 A | 12/1974 | Harris | 340/448 |
| 3,934,223 A | 1/1976 | Barabino | 340/446 |
| 4,017,826 A | 4/1977 | Enabnit | 4/460 |
| 4,067,376 A | 1/1978 | Barabino | 152/418 |
| 4,103,283 A | 7/1978 | Lee | 340/448 |
| 4,180,795 A | 12/1979 | Matsuda et al. | 340/448 |
| 4,334,428 A | 6/1982 | Fima et al. | 340/448 |
| 4,350,971 A | 9/1982 | Forrester et al. | 340/438 |
| 4,389,884 A | 6/1983 | Agulia | 340/445 |
| 4,392,382 A | 7/1983 | Myers | 73/708 |
| 4,588,978 A | 5/1986 | Allen | 340/448 |
| 4,695,823 A | 9/1987 | Vernon | 340/447 |
| 4,701,826 A | 10/1987 | Mikkor | 361/283.4 |

(List continued on next page.)

FOREIGN PATENT DOCUMENTS

| | | |
|---|---|---|
| DE | 873 213 | 4/1953 |
| EP | 0 202 375 A1 | 11/1986 |
| EP | 0 505 906 A1 | 9/1992 |
| GB | 1 528 505 | 8/1976 |
| GB | 2 058 420 A | 4/1981 |
| GB | 2 172 708 A | 9/1986 |
| GB | 2 337 335 A | 11/1999 |
| JP | 4-55739 | 5/1992 |
| WO | WO 94/20317 | 9/1994 |

*Primary Examiner*—Van T Trieu
(74) *Attorney, Agent, or Firm*—Harness, Dickey & Pierce, PLC

(57) ABSTRACT

A monitoring system for monitoring pressure in a tire of a trailer includes an active sensor, a receiver and an indicator. The active sensor is positioned at a first location and is operable to sense the pressure. The receiver is positioned at a second location remote from the first location and within proximity to the sensor. The receiver is operable to generate a signal indicative of the pressure and includes an inductor, and an amplifier having a feedback path. The inductor is positioned relative to the receiver to create an electromagnetically coupling between the inductors such that feedback from the coupling is one of either a substantially zero feedback and a negative feedback. The indicator outside of a vehicle is in communication with the receiver to provide a warning of a low pressure to the user.

15 Claims, 15 Drawing Sheets

U.S. PATENT DOCUMENTS

| | | | |
|---|---|---|---|
| 4,717,905 A | 1/1988 | Morrison, Jr. et al. ...... | 340/447 |
| 4,814,744 A | 3/1989 | Collins ....................... | 340/443 |
| 4,978,941 A * | 12/1990 | Brown ....................... | 340/447 |
| 5,006,844 A | 4/1991 | Ohta et al. .................. | 340/448 |
| 5,035,137 A | 7/1991 | Burkard et al. ............. | 340/442 |
| 5,071,259 A | 12/1991 | Metzger et al. ............. | 374/143 |
| 5,083,457 A | 1/1992 | Schultz ....................... | 340/445 |
| 5,181,423 A | 1/1993 | Phillips et al. .............. | 340/448 |
| 5,196,845 A | 3/1993 | Myatt ......................... | 340/445 |
| 5,218,861 A | 6/1993 | Brown et al. .............. | 73/146.5 |
| 5,231,872 A * | 8/1993 | Bowler et al. .............. | 340/445 |
| 5,274,355 A | 12/1993 | Galan ......................... | 340/445 |
| 5,473,938 A | 12/1995 | Handfield et al. .......... | 340/445 |
| 5,540,092 A * | 7/1996 | Hanfield et al. ........... | 74/146.5 |
| 5,663,506 A | 9/1997 | Moore et al. ................. | 73/708 |
| 5,728,933 A * | 3/1998 | Schultz et al. ............. | 73/146.5 |
| 5,741,966 A | 4/1998 | Handfield et al. .......... | 73/146.5 |
| 5,790,016 A | 8/1998 | Konchin et al. ............ | 340/448 |
| 6,175,302 B1 | 1/2001 | Huang ........................ | 340/442 |

* cited by examiner

INTER SUBROUTING

THIS SUBROUTINE CONTROLS THE TIMING FUNCTION FOR THE MICRO IN USE. ALSO THE FLASHING SEQUENCES, FOR THE LOW PRESSURE ALARM, RECEIVER & SENSOR DIAGNOSTIC FAULTS, IS CONTROLLED HERE VIA FLAGS.

THE SINGLE LIGHT DISPLAY SEQUENCES FOR THE TWO WHEEL & FOUR WHEEL SYSTEM IS DESCRIBED BELOW:

| | | |
|---|---|---|
| ALARM FAULT | DRIVER SIDE | FAST FLASH AT INTERVALS OF 70mS |
| ALARM FAULT | PASSENGER SIDE | SLOW FLASH AT INTERVALS OF 540mS |
| RECEIVER DIAG FAULT | SOLID LIGHT | |
| SENSOR DIAG | DRIVER SIDE FRONT LIGHT ON 8 SECONDS, FLASHES ONE OFF FOR 240mS | |
| SENSOR DIAG | PASSENGER SIDE FRONT LIGHT ON 7.8 SECONDS, FLASHES TWO OFFS AT INTERVALS OF 240mS | |
| SENSOR DIAG | DRIVER SIDE BACK LIGHT ON 7.4 SECONDS, FLASHES THREE OFFS AT INTERVALS OF 240mS | |
| SENSOR DIAG | PASSENGER SIDE BACK LIGHT ON 7 SECONDS, FLASHES FOUR OFFS AT INTERVALS OF 240mS | |

→ RETURN

*Fig. 5C*

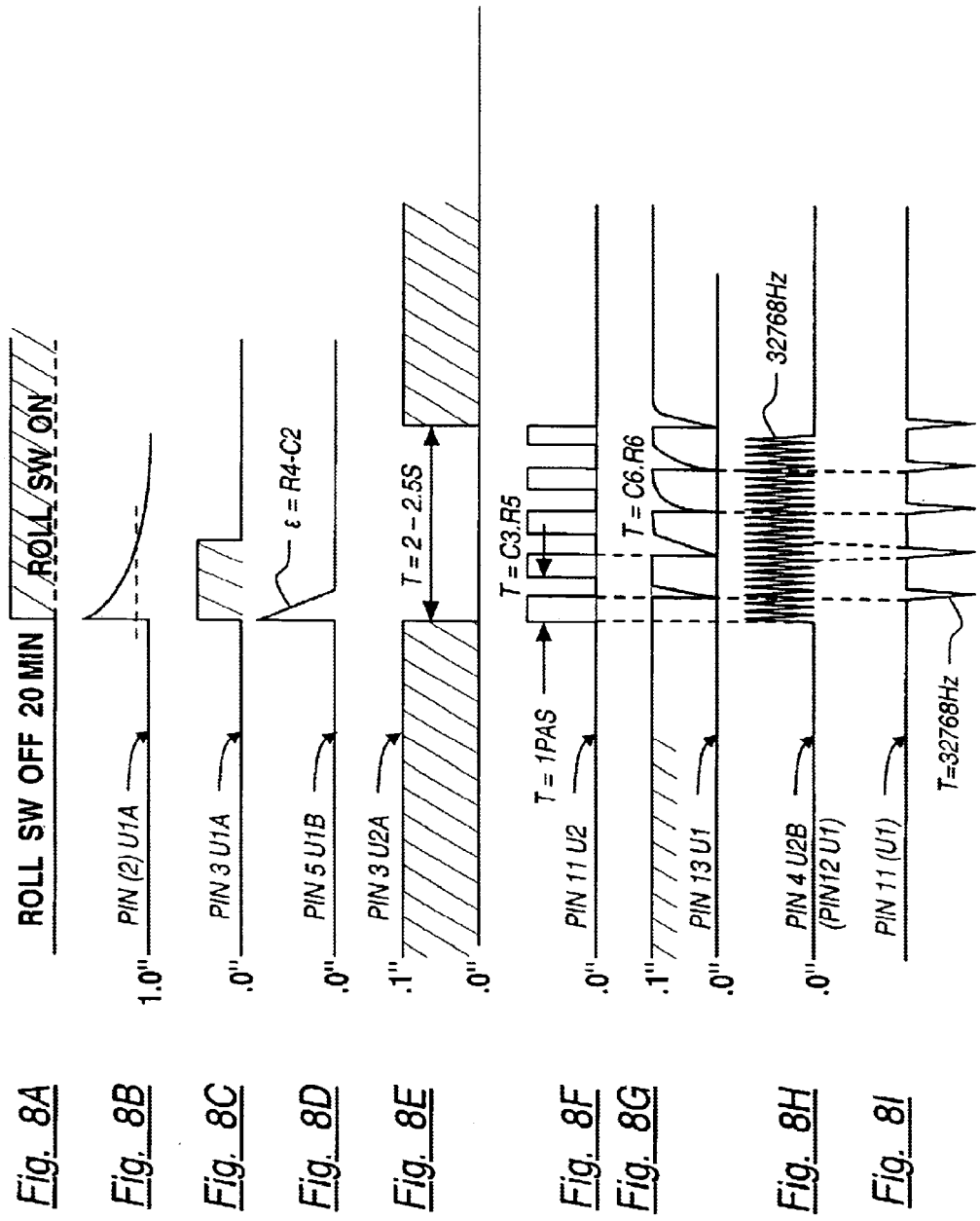

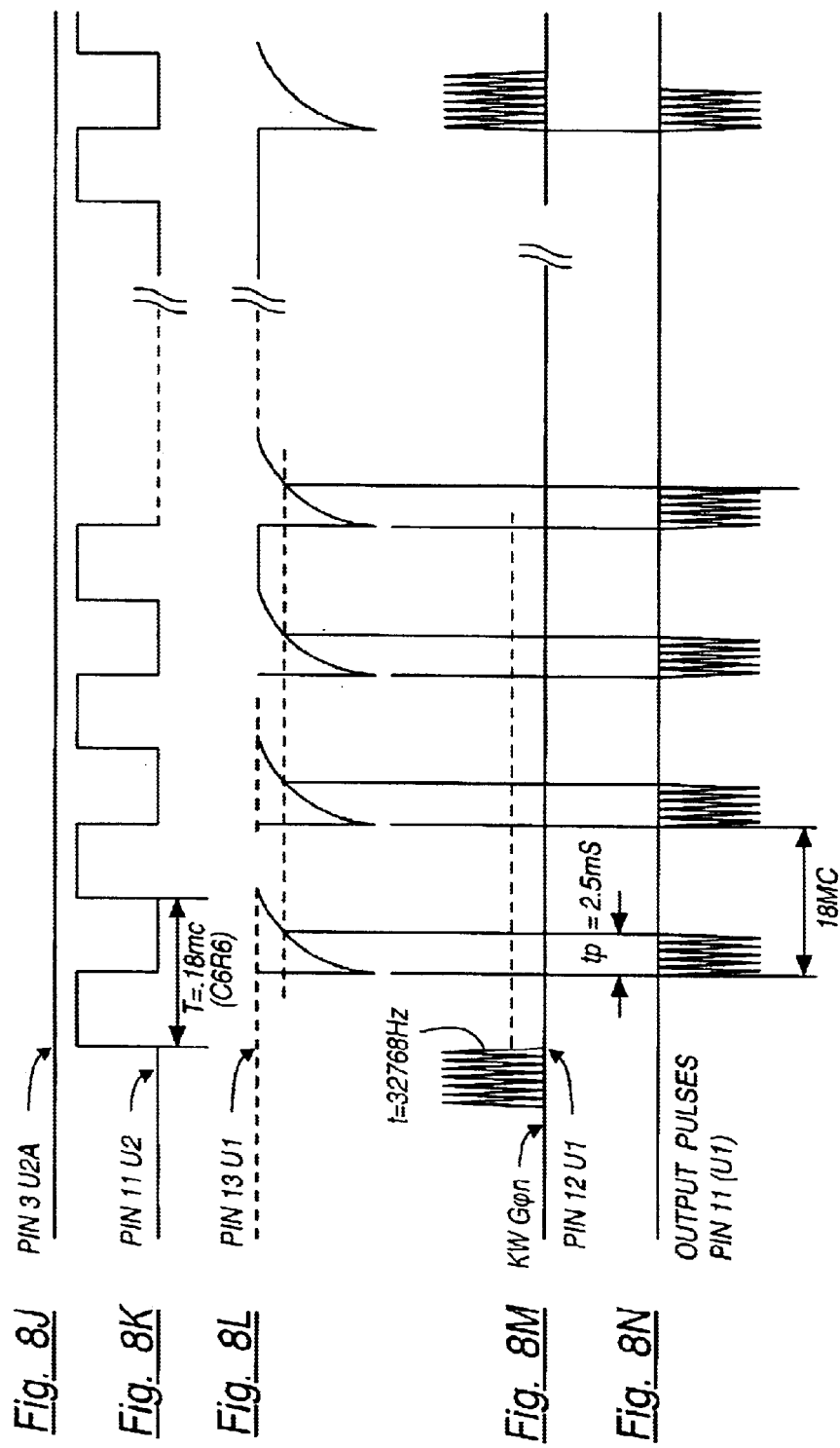

TIRE PRESSURE SENSING SYSTEM

CROSS REFERENCE TO RELATED APPLICATIONS

This application which is a continuation-in-part application of U.S. Ser. No. 10/044,806, entitled "TIRE PRESSURE SENSING SYSTEM", filed Jan. 10, 2002, now pending, which is a continuation-in-part application of U.S. Ser. No. 09/430,595, entitled "TIRE PRESSURE SENSING SYSTEM", filed Oct. 29, 1999, now U.S. Pat. No. 6,362,732, which is a continuation-in-part of U.S. Ser. No. 09/079,375, entitled "TIRE PRESSURE SENSING SYSTEM", filed May 15, 1998, now U.S. Pat. No. 6,124,787, which is a continuation-in-part application of U.S. Ser. No. 08/782,430, entitled "TIRE PRESSURE SENSING SYSTEM", filed Jan. 15, 1997, now U.S. Pat. No. 5,790,016, herein incorporated by reference.

FIELD OF THE INVENTION

The present invention relates generally to condition monitoring systems and, more particularly, to a system that monitors air pressure in the tires of a motor vehicle trailer, and that generates a visual signal viewable by a vehicle occupant indicative of the tire pressure in each of the tires to improve tire life, minimize tire wear, and increase vehicle performance and safety.

BACKGROUND OF THE INVENTION

Correct tire pressure is a critical factor in the safe operation and performance of a motor vehicle. Over inflated tires often result in unnecessary tire wear and less than optimal vehicle performance. Under inflated tires typically result in increased tire wear, decreased vehicle performance, and compromise the ability of the tires to maintain a safe interface with the road.

Conventionally, tire air pressure has been checked with mechanical gauges designed to be inserted over tire inner tube valve stems. Such gauges provide a generally accurate air pressure reading. However, the gauges are incapable of providing continuous monitoring of the air pressure within the tires and are limited in accuracy, and also require a driver concerned about tire air pressure to physically stop and exit the vehicle to check the tire pressure. In addition, such mechanical gauges do not provide any warning indication when the tire pressure reaches a level considered to be dangerous or unsuitable (such as below 14 psi in a typical passenger motor vehicle) for normal driving conditions.

Other systems utilize an active inductor capacitor (LC) circuit affixed within the tire to monitor tire air pressure. However, active LC circuits require a power source for operation. Because it is mounted within the tire, the power source, as well as the additional circuit components, are subjected to rotational vibration and other extreme conditions caused by temperature fluctuation. The circuit components may also be difficult to install and replace if damaged or depleted due to their location within the tire. In addition, such systems typically provide no warning to the driver when the tire pressure falls below or rise above a certain minimum/maximum acceptable level. Moreover, these active inductor capacitor (LC) type systems generally also utilize battery power when the vehicle is both in operation and also in a parked non-use condition, thereby reducing the overall battery life of the active inductor capacitor (LC) circuit.

Other systems may utilize a sensor system that require the location of the sensor relative to a receiver pickup to be in very close proximity to one another. This provides a great disadvantage in enabling various options for mounting locations of the receiver relative to the sensor which may invariably lead to mounting the receiver in a very harsh environment location. Additionally, such systems may also require very large size inductors (L) which is also very difficult and, in some instances, not practical for mounting within vehicle tires. These types of systems may also increase the overall undamped weight of the overall tire by requiring such a large inductor (L). Other systems also require hard wiring of pickup receivers to indicator devices in the vehicle. This type of hard wiring must be, thereby routed throughout the vehicle wiring system either during production of the vehicle or for after-market use. This makes it very difficult to install such a system for aftermarket use since generally this wiring must be mounted throughout the vehicle. Other systems further do not provide diagnostics to identify whether or not the system is, in fact, working properly.

Most tire pressure sensing systems are also primarily directed to sensing vehicle tire pressure. However, monitoring tire pressure of trailers attached to a vehicle is also a desired feature. When monitoring the tire pressure of a tire mounted on a trailer, however, in most instances the vehicle will require an indicator module and additional wiring mounted and located within the vehicle itself. This makes it difficult to retrofit a vehicle when a trailer is used. Also, drivers may not want to have associated accessories mounted within their vehicle when they only utilize a trailer on a part time basis. There is, therefore, a need for a tire sensor monitoring system which can easily and efficiently monitor tire pressure in a tire that is mounted on a trailer without requiring any modifications to the tow vehicle itself.

What is needed then is a tire pressure sensing system which does not suffer from the above-mentioned disadvantages. This, in turn, will provide a sensing system which monitors tire air pressure using an active sensor, that conserves battery life, provides improved mounting of the sensor within the tire, provides a system which is less susceptible to interference, provides a sensor system which can accurately monitor the change in tire air pressure, provides improved sensors which operate to identify if the tire air pressure is outside a pre-determined range, provide a sensor system which enables more versatility in the placement of a pickup receiver, provide a sensor system which conserves sensor battery power when the vehicle is not in use, provide a sensor system which can easily be installed for aftermarket use without requiring hard wiring between a receiver pickup and an indicator device, and provide system diagnostics to confirm proper operation of the overall tire monitoring system. It is, therefore, an object of the present invention to provide such a tire pressure sensing system.

SUMMARY OF THE INVENTION

The present invention provides a tire pressure monitoring system that utilizes an active LC circuit mounted within the tire of a trailer for monitoring tire air pressure. The active circuit conserves battery power by stabling the circuit when the vehicle is not in use. The tire pressure monitoring system of the present invention is configured to provide a visual indication to the driver when tire pressure in any of the tires on the trailer falls below a minimum acceptable level.

Use of the present invention provides a tire pressure monitoring system for monitoring air pressure within a tire on a trailer. The present invention further provides a system for monitoring a first parameter with a sensor located at a first location and a receiver located at a second location. As a result, the aforementioned disadvantages associated with the currently available methods and techniques for monitoring tire air pressure have been substantially reduced or eliminated.

BRIEF DESCRIPTION OF THE DRAWINGS

Still other advantages of the present invention will become apparent to those skilled in the art after reading the following specification and by reference to the drawings in which:

FIGS. 5a–5c are flow charts depicting the function of the system as depicted in FIG. 1;

FIGS. 8a–8h represent voltage versus time plots for various portions of the system during differing operational phases of system.

DETAILED DESCRIPTION OF THE PREFERRED EMBODIMENTS

The following description of the preferred embodiments concerning a tire pressure monitoring system are merely exemplary in nature and are not intended to limit the invention or its application or uses. Moreover, while the present invention is described in detail below with reference to monitoring tire air pressure within a tire mounted on a trailer, it will be appreciated by those skilled in the art that the present invention may be used to monitor any type of parameter with a sensor positioned at a first location and a receiver positioned at a second location and is, therefore, clearly not limited to only monitoring tire air pressure. For an example, the preferred embodiments of the present invention may be utilized to monitor pressure, temperature, movement, stresses, strains, etc. and may be mounted or inserted into various objects including tires, key chains, human bodies, etc.

Figure 1A:
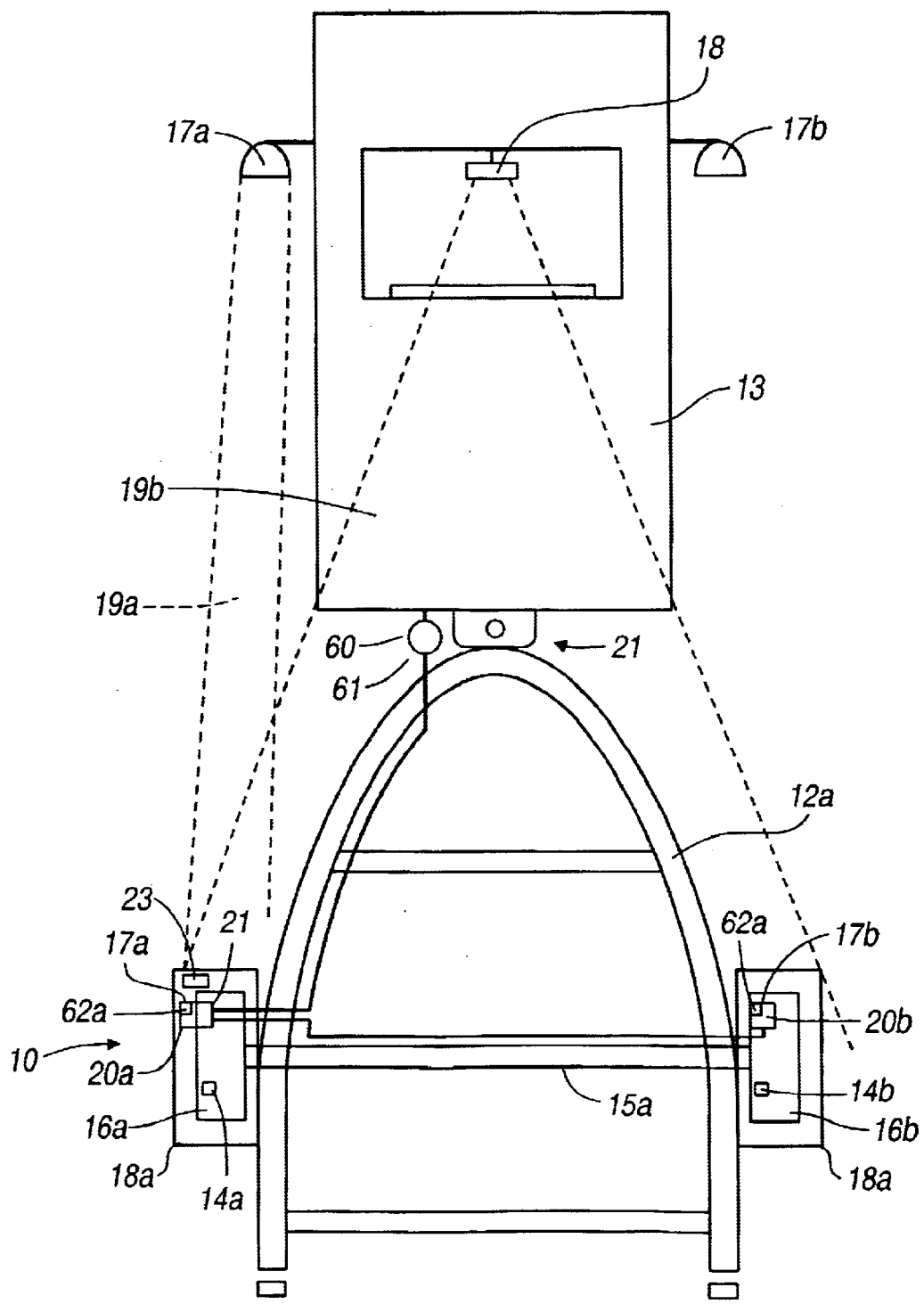
FIGS. 1a and 1b are a top plan views of a motor vehicle having a trailer including a tire pressure monitoring system of the present invention.
Figure 1B:
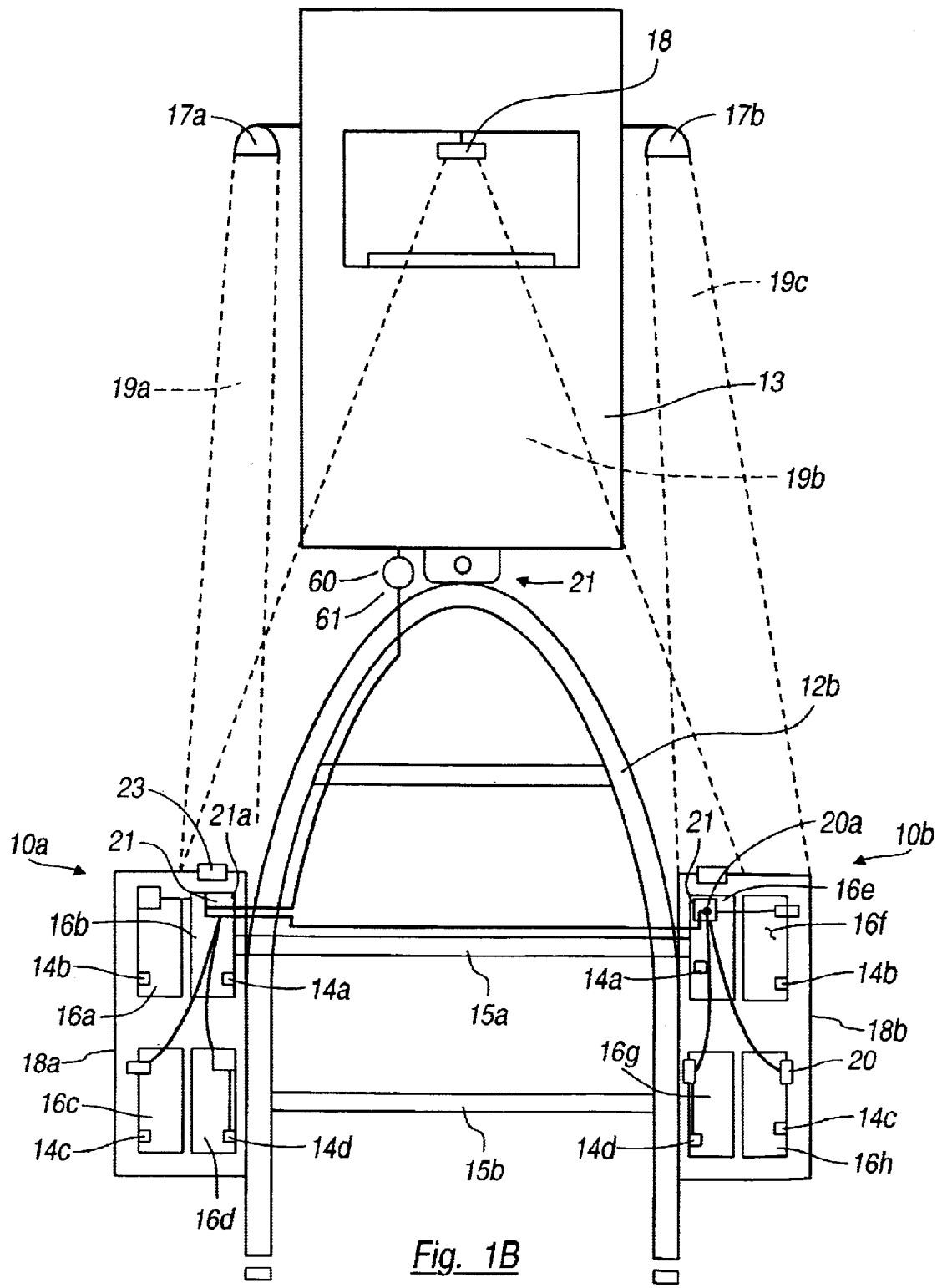
Figure 1C:
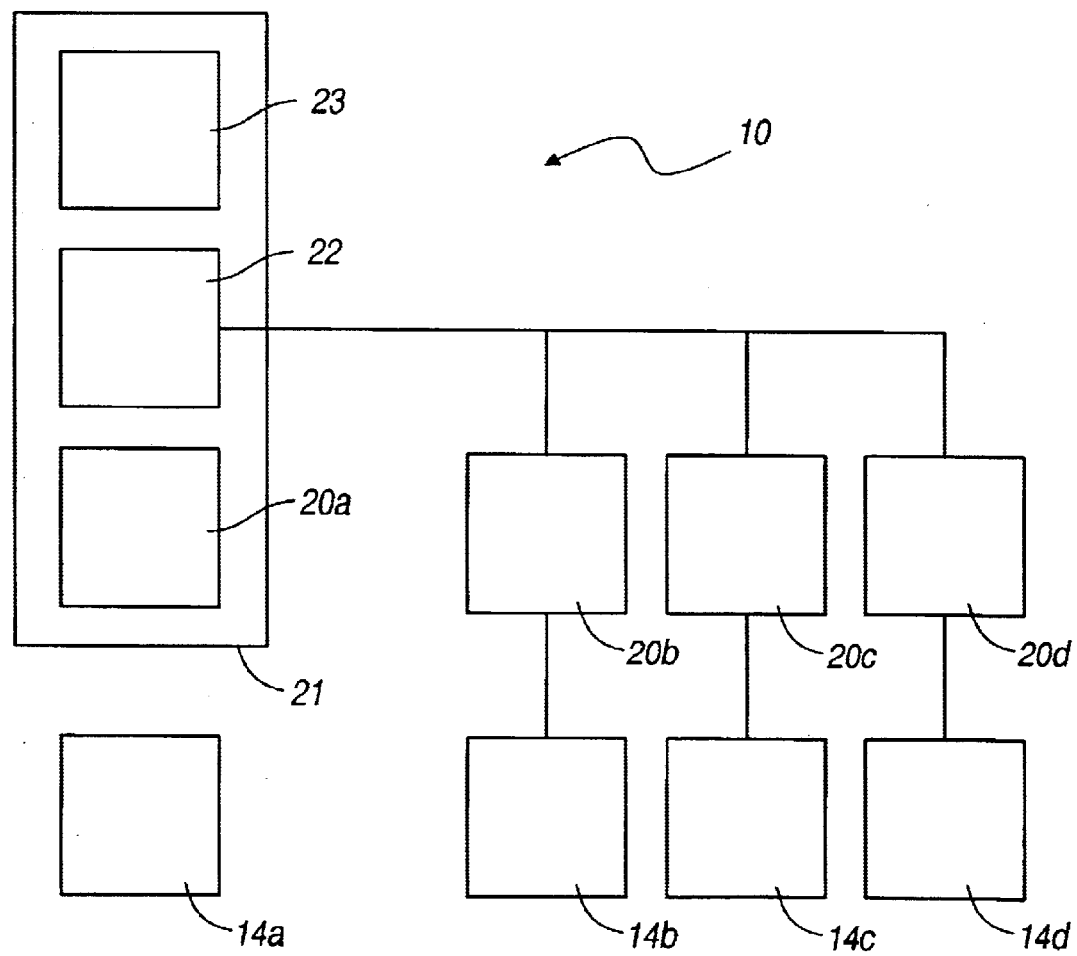
FIG. 1c is a block diagram of the system.

With general reference to FIGS. 1a–1c, shown is the tire pressure monitoring system (TPMS) 10 of the present invention coupled to a trailer 12. The trailer 12 is coupled to a towing vehicle 13 using a standard hitch couple 21 which includes a standard electrical connector 61 to bring power and brake light signals to the trailer 12. FIG. 1 discloses a first embodiment of the present invention where the TPMS 10 is used on a trailer 12 having fewer than four tires 16a–16b.

The TPMS 10 consists of at least two sensor transducers 14a and 14b, each mounted to the inside or outside of a corresponding tire 16a and 16b, and at least two receivers 20a and 20b each mounted via brackets (not shown) to the trailer 12 at a distance of several centimeters away from the inner edge of the corresponding tire. The TPMS 10 continuously monitors air pressure within each of the tires 16a and 16b during motion of the motor vehicle through generation of an electromagnetic coupling between corresponding pairs of sensor transducers 14a and 14b and the receivers 20a and 20b during an alignment that occurs between the transducers 14a and 14b and receivers 20a and 20b during each rotation of the tires 16a and 16b. As will be described in detail below, this coupling may function to indicate when tire pressure has fallen below predetermined minimum value. In this regard, the TPMS 10 illustrates the general overall system configuration for the embodiment discussed herein.

A receiver indicator module 21 includes the circuit receiver 20, a processor 22, and an indicator 23. The processor 22 is configured (as described in detail below) to pole the outputs of the receivers 20a and 20b to determine if an alarm condition has been forwarded by sensors 14a and 14b. The indicator 23 is coupled to the processor 22 and is configured to be remote from the vehicle and viewable by a vehicle's driver while the driver is inside the vehicle. In this regard, the occupant is capable of viewing the indicator 16 by viewing it through the reflections of the side mirrors 17a–17b or the rearview mirror 18. The indicator 23 is positioned on the trailer fender so as to be in the field of view 19a or 19b of the occupant.

Referring generally to FIG. 1b which depicts an alternate trailer 12b in use with a vehicle 13. Trailer 12b is configured so as to have more than six wheels. In this situation, two independent TPMS systems 10a and 10b will be usable. Each TPMS system 10a and 10b is configured to monitor the tire pressure of the tires 16a–16d on each side of the trailer 12b. With this regard, each individual TPMS system 10a–10b has a corresponding indicator 23a–23b. Each of these indicators is positioned on the trailer fenders 18a–18b so as to be in the field of view 19a–19b or 19c of the driver.

Referring generally to FIG. 1c which depicts a block diagram of the TPMS system 10 according to the teachings of the present invention, shown is the receiver indicator module 21 having an incorporated receiver 20, a processor 22, and an indicator 23. The receiver 20 functions to receive information from the active sensor 14a. Processor 22 holds the output from the receiver 20 to determine whether a diagnostic or a alarm condition is occurring. In either situation, the processor 22 initiates a signal to the driver through the indicator 23. Additionally, processor 22 is configured to pole up to three additional receivers 20b and 20c which are monitoring the outputs of sensors 14a–14c.

Figure 2A:
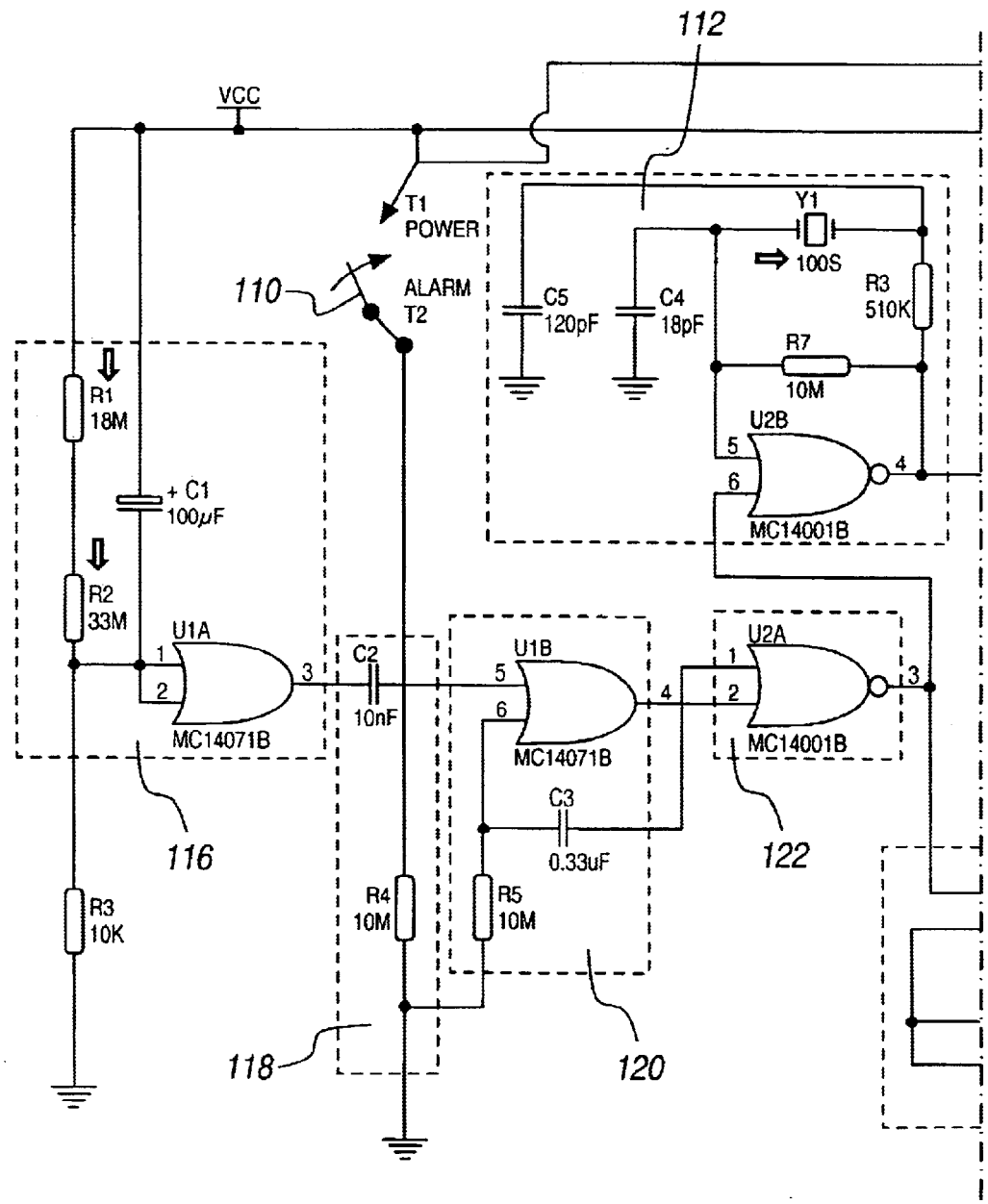
FIGS. 2a and 2b are an electrical schematic diagram of a preferred embodiment of a tire pressure sensor in the system shown in FIG. 1.
Figure 2B:
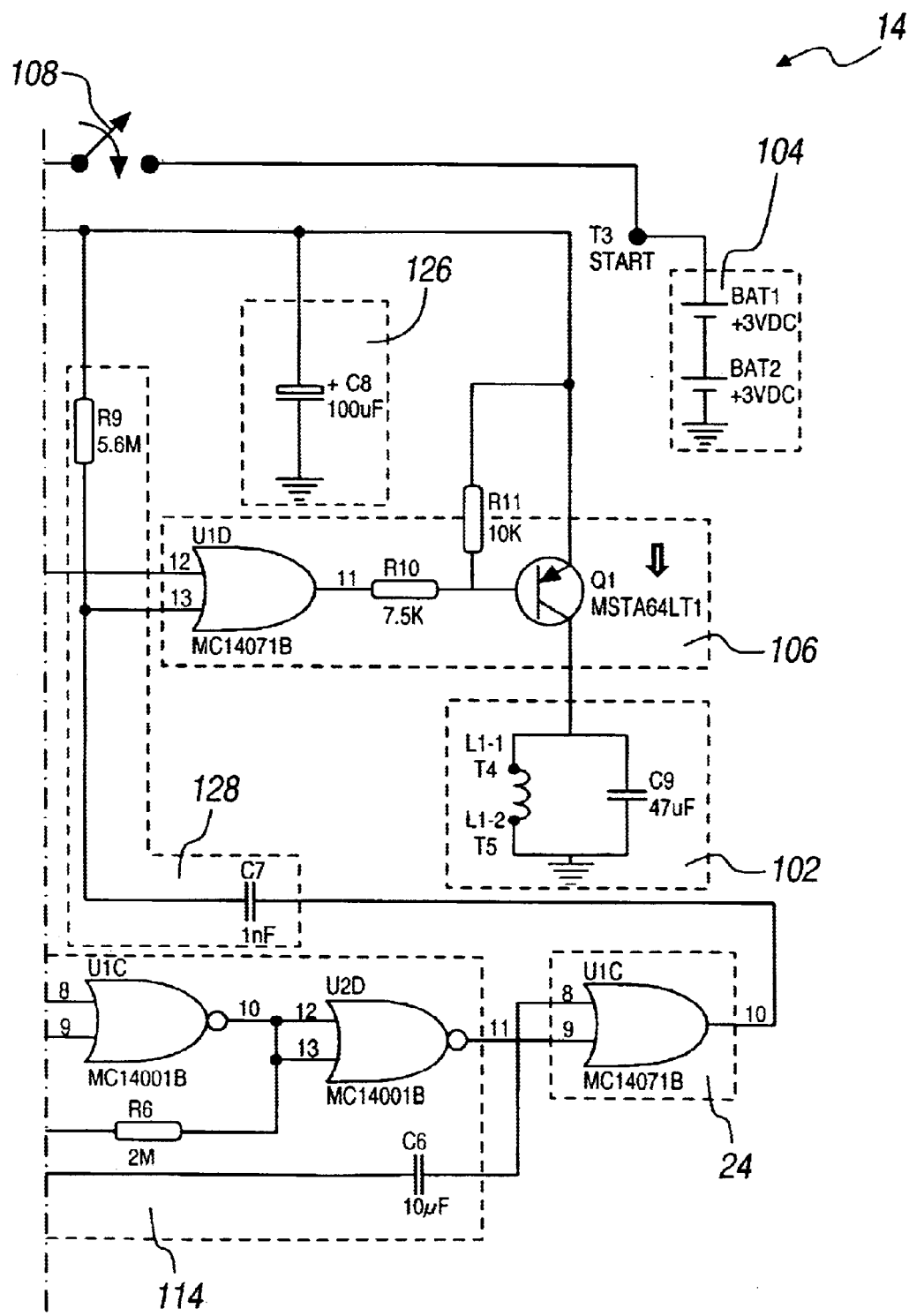

Referring to FIGS. 2a and 2b, the active sensor 14 according to the teachings of a preferred embodiment of the present invention is shown. The active sensor 14 is used in place of passive sensors. However, a passive sensor may also be used in the TPMS 10 disclosed herein. By use of the active sensor 14, the active sensor 14 may be positioned in a range of about 14 centimeters to about 50 centimeters relative to a receiver which is an increase of about 25 times the range compared to the use of a passive sensor. The active sensor 14 also enables the use of a smaller inductor (L) as opposed to some passive sensor systems. The active sensor 14 is mounted within a tire 16 similar to that shown in FIG. 1a.

The active sensor 14 includes an LC circuit 102 formed by inductor L1 and capacitor C9, along with a power source 104 formed by a pair of +3 volt batteries aligned in series to power the overall active sensor 14. The output from the resonant tank or LC circuit 102 is amplified by way of an amplification circuit 106. To power up the active sensor 14, a roll switch 108 and a pressure switch 110 are also provided. The active sensor 14 further includes a 32 KHz generator 112, a 25 Hz generator 114, a diagnostic time delay circuit 116, a switch debounce circuit 118, a diagnostic signal duration circuit 120, an inverter 122, a buffer 124, a storage tank 126 and a 178 Hz generator 128.

The roll switch 108 actuates or closes upon the vehicle traveling above a predetermined speed, such as 15 kilometers per hour, and is formed by way of a weight and spring 130. The pressure switch 110 is formed from a pair of circular shaped diaphragms which are micro-plasma welding together about the outer circumference of the diaphragms. Upon decreasing to a predetermined pressure, such as 20 psi, each diaphragm expands relative to one another to close the pressure switch 110. The inductor L1 in the LC circuit 102 is formed upon an inductor bobbin assembly. The coil is preferably formed from 30 gauge wire to create a 0.5 mH inductance. The types of components utilized for the remaining active sensor 14 is identified clearly in FIGS. 2a and 2b.

In use, when the vehicle is stationary and assuming the tire pressure of the trailer tire 16 is above the predetermined value, both the roll switch 108 and the pressure switch 110 are open. In this condition, VCC or power is not supplied to any of the circuitry and no current is drawn from the power source 104. Once the vehicle is traveling above the predetermined speed, the roll switch 108 will close, thereby supplying power from the power source 104 to the logic circuit in the active sensor 14, via the power line VCC. Upon the roll switch 108 closing, the diagnostic time delay circuit 116 will provide a momentary high output ("1") at pin 3 of OR gate U1A, via resistors R1 and R2 with resistor R3 acting as a hold down resistor. Upon this momentary high output at pin 3 due to a high input at pins 1 and 2 of the OR gate U1A, capacitor C1 will begin charging, thereby lowering the logic input at pins 1 and 2 of OR gate U1A to below 3 volts or a low ("0") input, thereby rendering a low output ("0") at pin 3. Should the vehicle be operating in traffic or be in start and stop conditions, with the capacitor C1 fully charged, toggling of the roll switch 108 will inhibit further high outputs from the diagnostic time delay circuit 116 unless the roll switch remains opened for at least 44 minutes. In other words, resistors R1 and R2, along with capacitors C1 and C8 form a time constant T=RC of 44 minutes upon charging capacitor C1 and C8. Therefore, C1 and C8 will not discharge to enable a high output at pin 3 of OR gate U1A, unless the roll switch 108 remains open for more than 44 minutes to discharge the capacitor C1 and C8. The diagnostic time delay circuit thus acts to eliminate random or inadvertent diagnostic pulses from the trailer 12.

With the momentary high output from the diagnostic time delay circuit 116, (i.e., pin 3 and U1A="1") the diagnostic signal duration circuit 120 will provide a high output at pin 4 of OR gate U1B for about 3.3 seconds based upon the time constant formed by C3 and R5. In this regard, the high output from the diagnostic time delay circuit 116 passes from the switch debounce circuit 118 to provide a high input at pin 5 of OR gate U1B for a short momentary time period. This causes the output pin 4 to go high which then causes the input pin 6 to stay high for 3.3 seconds enabling the high output at pin 4 to be maintained for the 3.3 seconds. This high output is passed through inverter 122 formed by a NOR gate U2A creating a low output at pin 3 of NOR gate U2A. This low output is applied to both the 32 KHz generator 112 and the 25 Hz generator 114.

The low output from the invertor 122 starts the 32 KHz oscillator 112 to oscillate at about 32.768 KHz which is output at pin 4 of NOR gate U2B. This low output also causes the 25 Hz generator circuit 114 to provide a 25 Hz output at pin 11 of NOR gate U2D which is passed through buffer 124. The 32 KHz signal from the 32 KHz generator 112 and the 25 Hz signal from the 25 Hz generator 114 are both applied to the amplifier circuit 106. The 32 KHz signal is applied to pin 12 of OR gate U1D directly, while the 25 Hz signal is applied to pin 13 through the 178 Hz generator (5.6 ms) 128. With pin 12 or pin 13 of OR gate U1D high, output at pin 11 is high which maintains the transistor Q1 turned off, thereby inhibiting the resonator tank or LC circuit 102 from oscillating. As the 25 Hz signal is supplied through the buffer 124, pin 10 of OR gate U1C goes high and low every 0.04 seconds (25 Hz). When pin 10 initially goes low, there is a voltage differential across capacitor C7 which enables the transistor Q1 to turn off and on at the 32 KHz rate, via pin 12, thereby causing the LC circuit 102 to oscillate at 32 Khz. As the capacitor C7 charges for 5.6 ms, the transistor Q1 is then inhibited from oscillating at 32 KHz.

Figure 6:
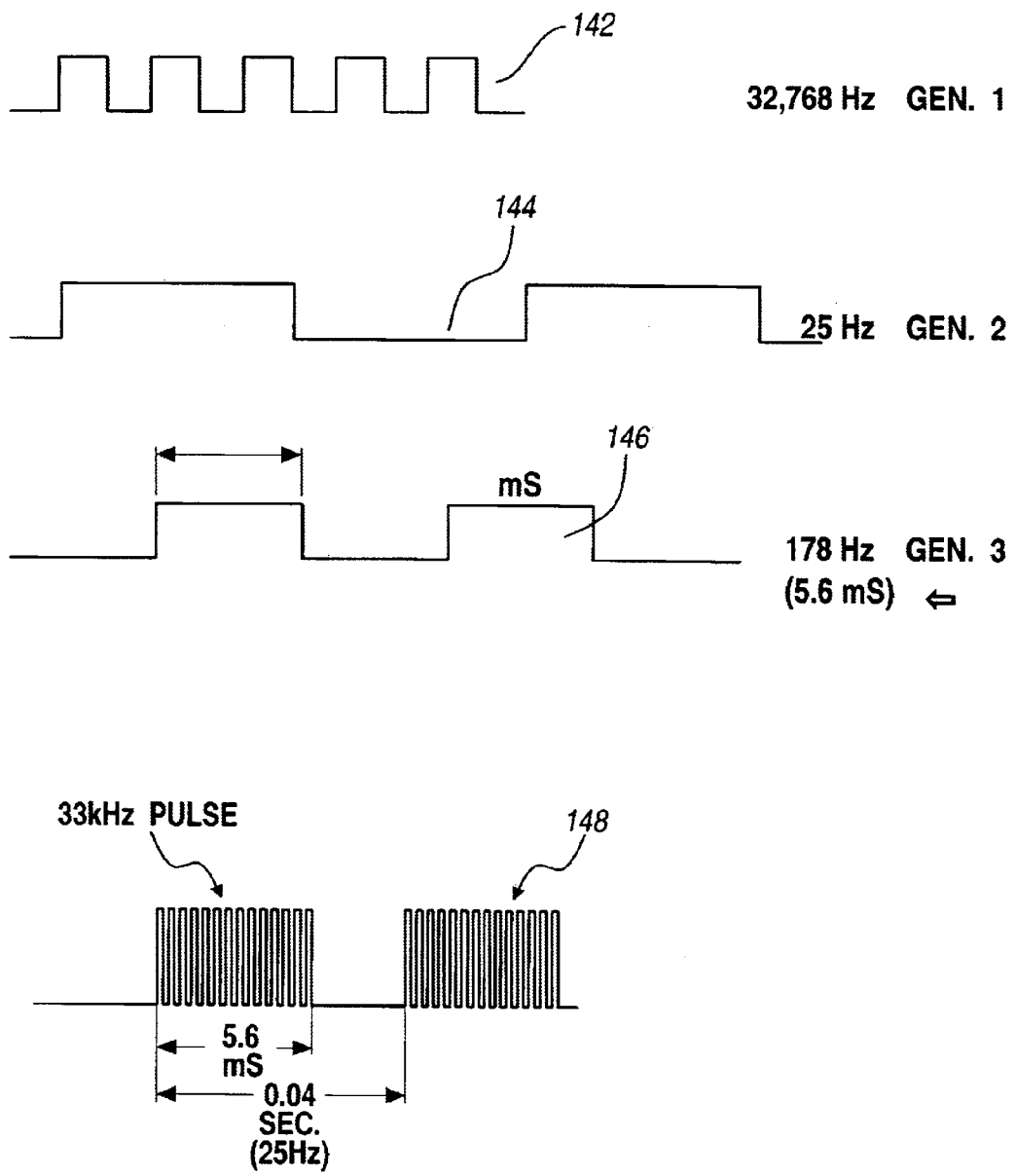
FIG. 6 represents two signals as produced by the sensor of FIG. 2.

Referring to FIG. 6, a 32 KHz signal 142 is shown, which is generated from the 32 KHz generator circuit 112. A 25 Hz signal 144 is shown, which is generated by the 25 Hz generator 114 and a 178 Hz signal (5.6 millisecond) 146 is shown, which is generated by the 178 Hz signal generator 128. The output signal generated by the LC circuit 102 is shown as waveform 148, which consists of the 32 KHz pulse 142 lasting for a duration of the 5.6 millisecond pulse 146 and occurring every 25 Hz. When in a diagnostic mode, this waveform 148 will last for approximately 3.3 seconds, via the diagnostic signal duration circuit 120. Should the tire pressure drop below a predetermined value and the pressure switch 110 close, the waveform 148 will be a continuous pulse and not limited by the diagnostic signal duration circuit 120 since a high output will always be applied to pin 5 of the OR gate U1B. By providing both a diagnostic signal that lasts for about 3.3 seconds or an alarm signal having an indefinite duration, a user or driver of a vehicle is able to first confirm that the particular sensor 14 is operational and also determine whether or not one of the tires 10 or the trailer 12 has dropped below a predetermined pressure. Also by providing the roll switch 108, battery power is conserved, thereby providing a sensor 14 that should have a usable life of about five (5) years of normal vehicle operation.

Figure 3:
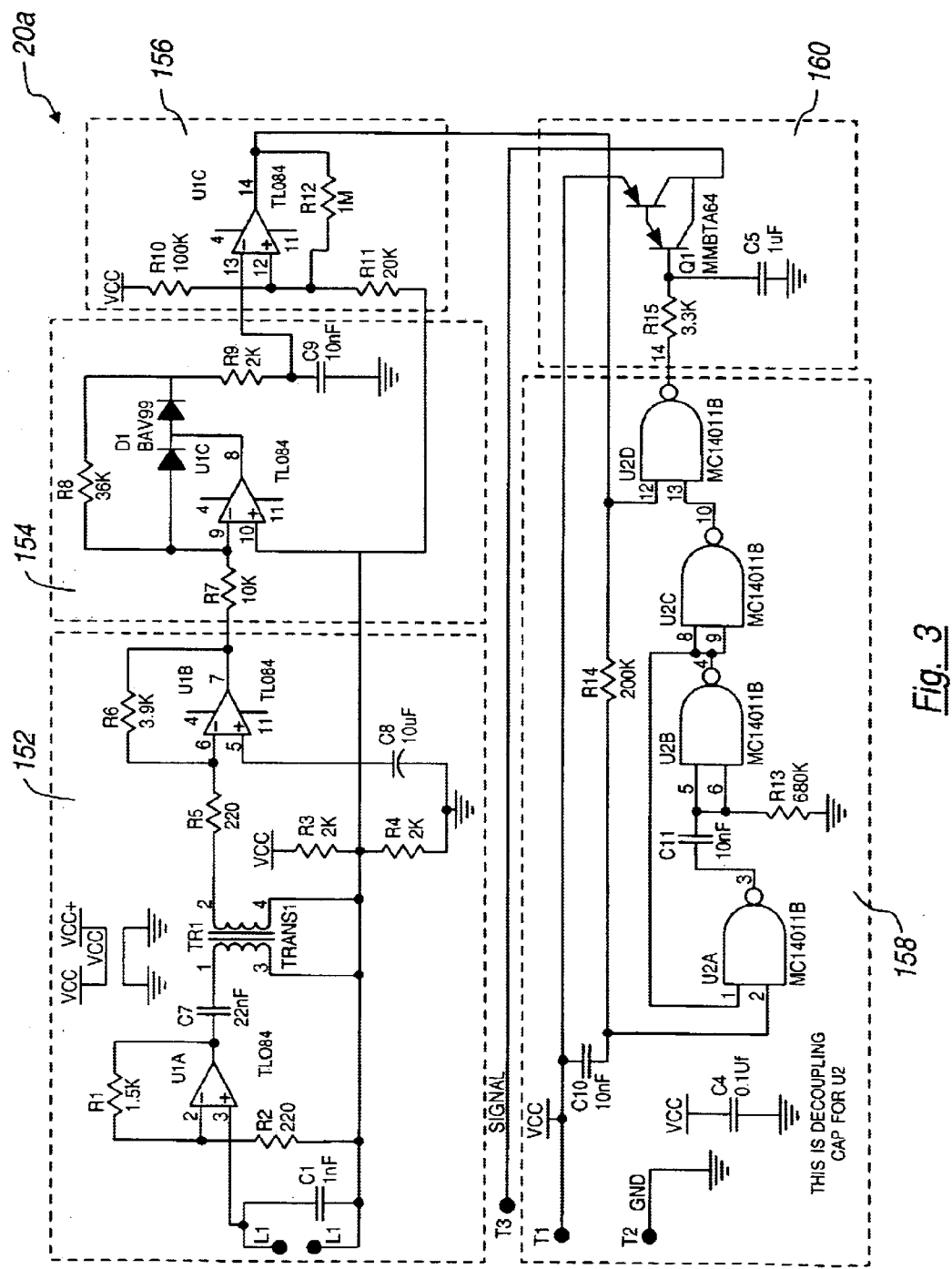
FIG. 3 is an electrical schematic diagram of a preferred embodiment of a receiver of the system shown in FIG. 1.

Referring now to FIG. 3, the receiver 20a which forms part of the receiver indicator module 21, as well as receivers 20b–20d, according to the teachings of the preferred embodiment of the present invention is shown in detail. The receiver 20a includes a two-stage amplifier circuit 152, a high to low frequency converter circuit 154, a comparator circuit 156, a bandpass filter logic 158 and an AC to DC converter 160. The two-stage amplifier circuit 152 operates similar to receive signals from the sensor 14 and includes an inductor L1. The inductor L1 is formed on a receiver bobbin assembly and turned about the bobbin to create an inductance of about 23 mH.

The two-stage amplifier circuit 152 includes a first op-amp U1A in electrical communication with a second op-amp U1B. Resistors R1 and R2 create a gain of 6–7 for the first op-amp U1A and resistors R5 and R6 create a gain of 14–15 for the second op-amp U1B. Resistors R1, R2, R5 and R6 also determine the feedback sensitivity of the two-stage amplifier circuit 152, as well as also form the feedback path for the two-stage amplifier circuit 152. The receiver coil L1 and capacitor C1 form an input resonant tank.

When the active sensor 14 is positioned in operative proximity to the receiver 20 and is operational by way of either the diagnostic pulse from the roll switch 108 or the alarm pulse from the pressure switch 110, the waveform 148 is amplified and passed through the output of the two-stage amplifier circuit 152. Here again, the inductor L1 is positioned so that feedback in the two-stage amplifier circuit 152 is either zero or a negative value when the sensor 14 is not in operative proximity to the receiver 20. Alternatively, when the sensor 14 is positioned in operative proximity to the receiver 20 and is also on, this feedback goes to a positive value.

The 32 KHz signal which has a duration of 5.6 milliseconds and oscillating at 25 Hz, as shown by waveform 148, is then applied to the high frequency to low frequency converter circuit 154. The high to low frequency converter circuit 154 includes a gain of two and rectifies and filters the 32 KHz pulse into a 5.6 millisecond duration pulse occurring every 25 Hz by way of the rectifier diodes D1 and RC filtering R9 and C3. In other words, the waveform 148 is rectified to remove the high frequency (i.e., 32 KHz) component to simply provide 5.6 millisecond duration pulses occurring every 25 Hz. This lower frequency signal is then applied to the comparator circuit 156. The comparator circuit 156 is formed by op-amp U1D which receives a voltage of about 9 volts and input pin 12, via voltage divider R10 and R11. When the inverting input pin 13 is less than about 9 volts, output at pin 14 is high. Alternatively, when the input at the inverting pin 13 is greater than that at pin 12, the output of the op-amp U1D at pin 14 goes low. In other words, the output of the op-amp U1D will go low for about 5.6 milliseconds every 0.04 seconds or 25 Hz for a duration of 3.3 seconds if it receives a diagnostic signal or indefinite if it receives an alarm signal.

Figure 7:
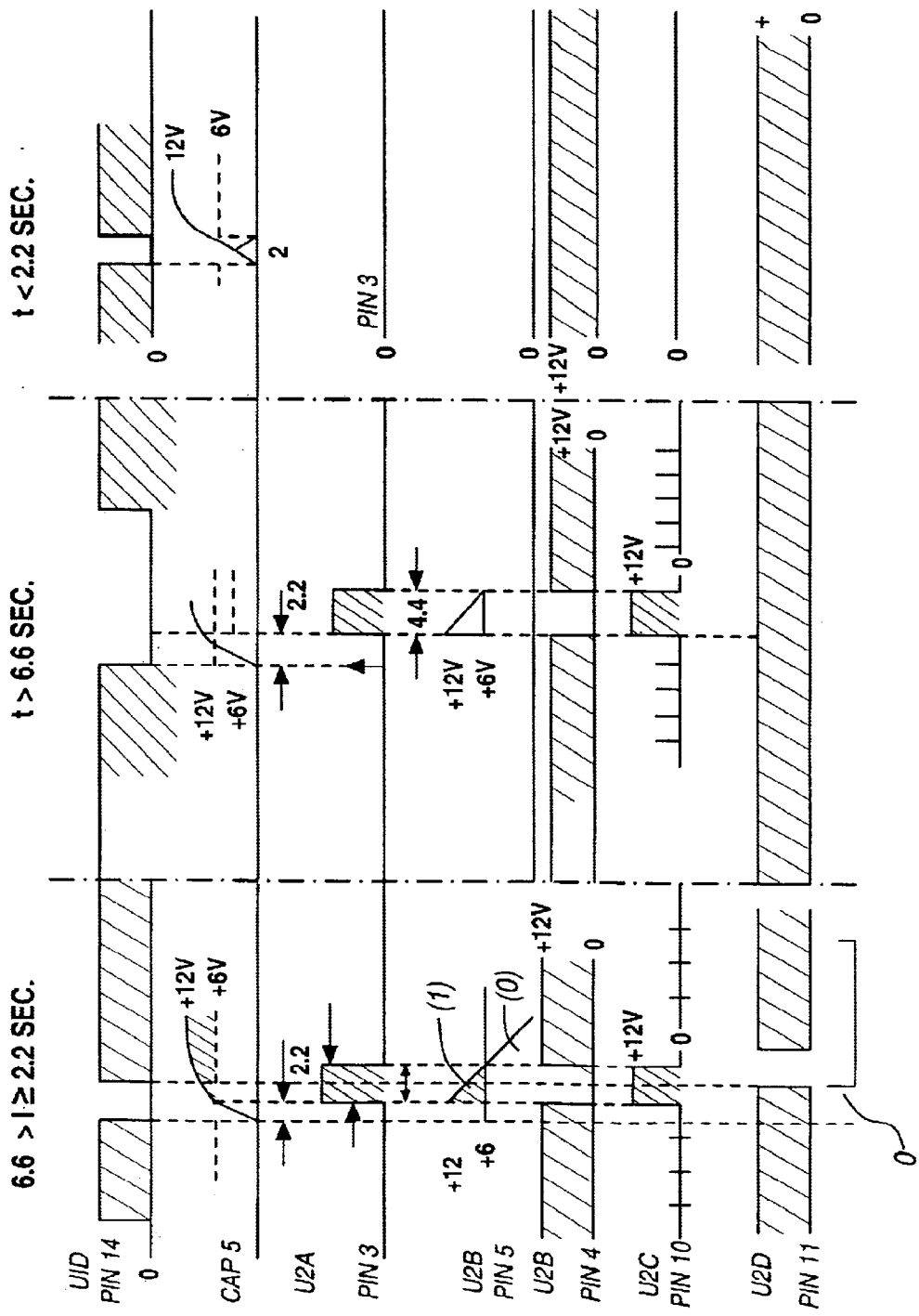
FIG. 7 represents a voltage versus time plot for various portions of the system according to FIG. 1.

This low frequency oscillating output from the comparator circuit 156 is then applied to the bandpass filter 158. With reference to FIG. 7, the bandpass filter 158 filters out or eliminates pulses having a duration of less than about 2.2 seconds or greater than about 6.6 seconds. In this regard, column 1 of FIG. 7 shows the operation of the bandpass filter 158 when the duration of the pulse from the comparator circuit 156 is between about 2.2 to 6.6 seconds, column 2 shows the operation when the output is greater than 6.6 seconds and column 3 shows the operation when the pulse from the comparator circuit 156 is less than 2.2 seconds. The first row of FIG. 7 shows the output from the comparator circuit 156 or pin 14 of the op-amp U1D. The second row shows the charging of the capacitor C5 in the bandpass filter 158. Row 3 shows the output of pin 3 of the NAND gate U2A. Row 4 shows the input to pin 5 of the NAND gate U2B. Row 6 shows the output at pin 4 of the NAND gate U2B. Row 5 shows the output at pin 10 of the NAND gate U2C. Row 7 shows the output at pin 11 of the NAND gate U2D which is the output of the bandpass filter 158.

Upon review of FIG. 7, it can be observed that should the output from the comparator circuit 156 be low for between 2.2 to 6.6 seconds, the bandpass filter 158 will provide a momentary low output. Otherwise, should the duration be less than 2.2 seconds which may occur from spikes generated in the automotive environment or greater than 6.6 seconds which could indicate improper operation of the sensor, the output of the bandpass filter 158 remains high (see Row 7). Thus, the bandpass filter will only pass a signal having a specific signature (i.e., 5.6 ms pulses occurring at 25 Hz).

When the output of the bandpass filter 158 goes low, the transistor Q1 in the AC to DC converter 160 turns on to provide a high DC output signal at output T2 due to the filtering of resistors R17 and R18, along with capacitor C7. The duration of this DC output will vary depending on whether the sensor 14 is forwarding a diagnostic signal or an alarm signal. In this regard, should a diagnostic signal be forwarded by the sensor 14, the DC output from the receiver 20 will have a duration of about 6.6 seconds which is controlled by both the diagnostic signal duration circuit 120 and the AC to DC converter 160. Otherwise, the DC output from the receiver 20 at output T2 will remain indefinite identifying an alarm signal. The receiver 20 can thus eliminate spurious signals which may be generated by noise in the automotive environment resulting in short duration spikes or pulses and may also eliminate pulses not meeting the signature waveform, as shown as waveform 148 without the 32 KHz pulse. This type of logic filtering is very useful in the automotive environment because the automotive environment generally will receive various spikes in various systems, as well as other oscillating type pulses. Thus, the receiver 20 only provides the desired output when it receives the pulse having a particular signature (i.e., waveform 148).

Figure 4:
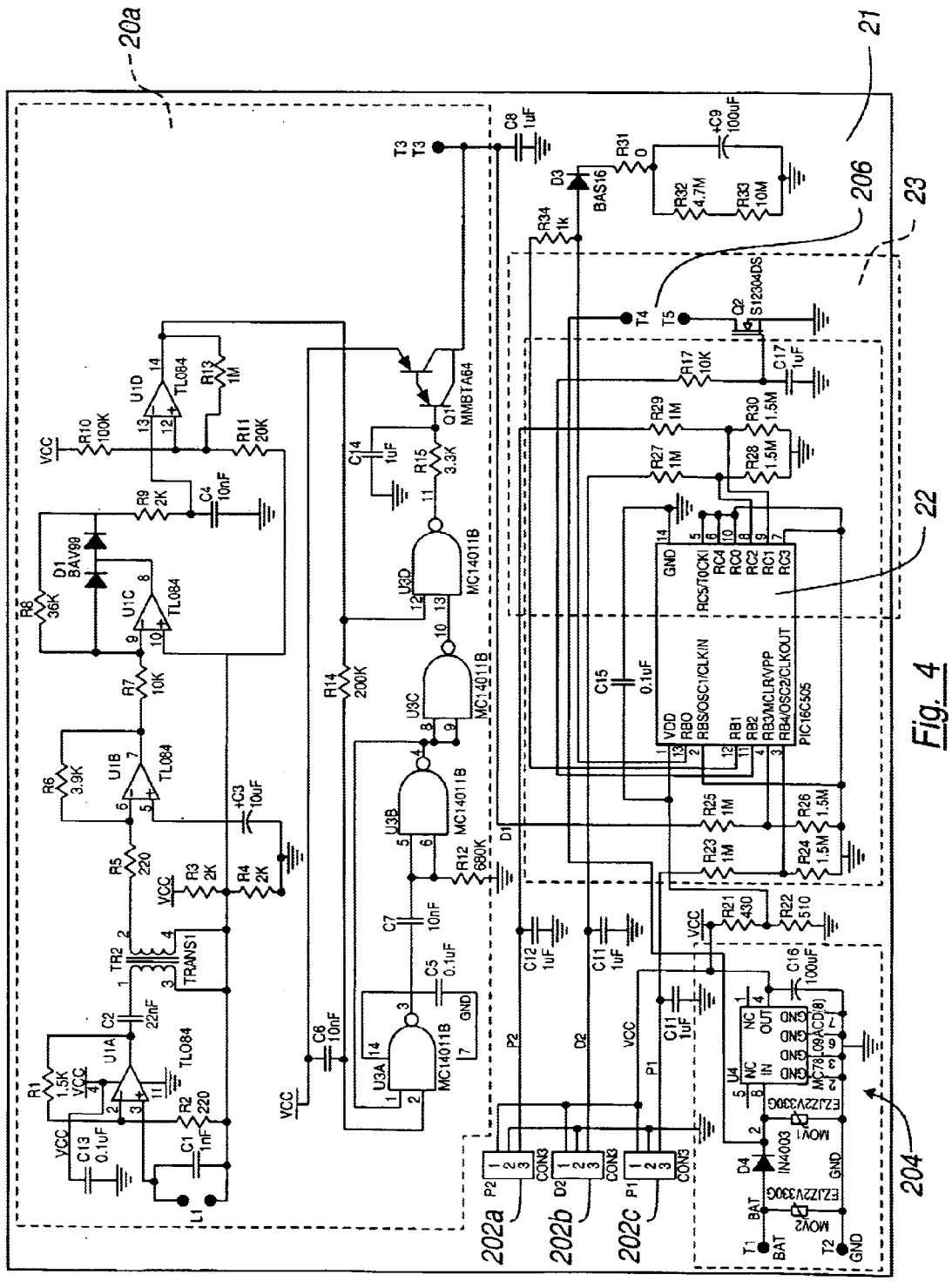
FIG. 4 is an electrical schematic diagram of a preferred embodiment of a receiver with indicator of the system shown in FIG. 1.

Referring now to FIG. 4, a receiver indicator module 21 according to the teachings of the preferred embodiment of the present invention is shown in detail. Receiver indicator module 21 incorporates the components and functionality of the receivers 20a–20c described above. Additionally, receiver indicator module 21 includes a processor 22 which monitors not only the signals produced by its own receiver 20d, but the output of the signals from receivers 20a–20c.

Signals from the receiver 20a–20d are coupled to the receiver indicator module 21 via connectors 202a–202c. Processor 22 functions to monitor the output of the receivers 20a–20d in pins 4, 3, 8 and 9 respectively. Additionally, receiver indicator module 21d has a power supply 204 and an indicator 23 formed by the output components of the processor 22 to switch Q2 to allow battery power via the power supply 60 to drives indicator 23.

Functionality of the processor within the system is best described with reference to FIGS. 5a–5c which depict a flow chart of the functioning systems.

Figure 5A:
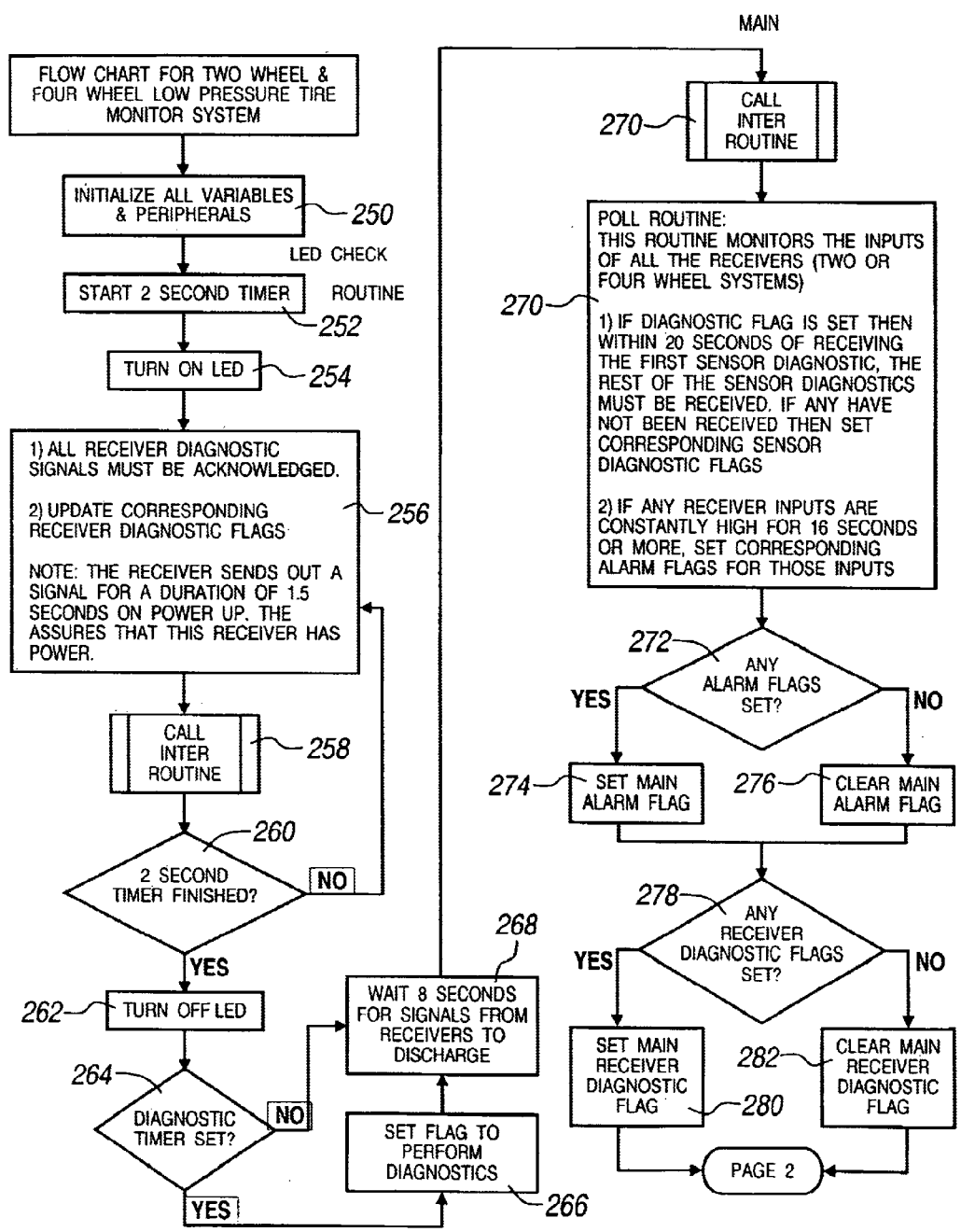
Figure 5B:
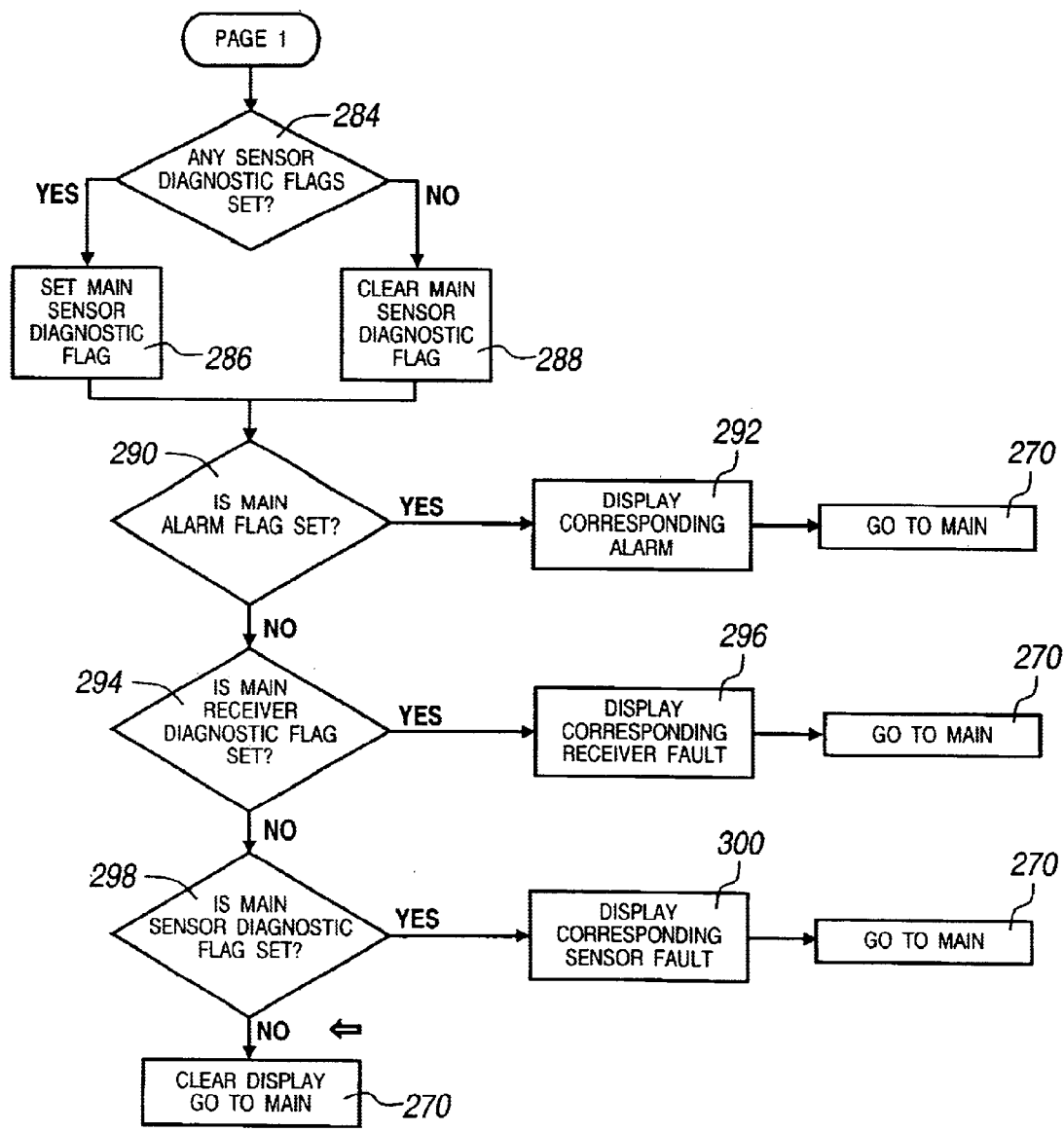

A flow chart for describing the two and four wheel low pressure tire monitoring system according to the present invention is best seen in FIGS. 5a–5c. In process block 250, the processor 22 is initialized by resetting and clearing all flags in process block 250. The processor 22 starts a two second timer 252 to allow each of the receivers to properly initialize. At this time, the microprocessor turns on the indicator LED 206 in process block 254. In process block 256, the processor 22 interrogates whether diagnostic signals have been received from the receivers 14a and updates corresponding receiver diagnostic flags. In process block 258, the processor 20 calls the intersubroutine. This subroutine controls the timing function for the microprocessor in use. Further, the flashing sequences for the low pressure alarm, receiver sensor diagnostic signal is controlled via memory flags.

In decision block 260, the processor 22 determines whether the two second timer has finished. Should the two second timer finish, process block 262 turns off the indicator LED 206. In query block 264, the processor 22 determines whether the diagnostic timer has been set. If the diagnostic timer has been set, the processor 22 in process block 266 sets flags to perform the diagnostic. If the diagnostic timer has not been set in query block 264, process block 268 waits for eight seconds for signals from the receivers to discharge. Process block 270 again returns to the call interroutine to update the output of the LED 206 as is needed. Process block 270 places the processor 22 in a position which routinely monitors the inputs of all of the receivers of the system. If the diagnostic flag is set within twenty seconds of receiving the first sensor diagnostic, the rest of the sensor diagnostics must be received. If any have not been received, then a corresponding sensor diagnostic flag is set. Additionally, in process block 270, if any receiver inputs are constantly high for sixteen seconds or more, a corresponding alarm flag for those inputs is set. In query block 272, the processor 22 determines if an alarm flag has been set. If an alarm flag has been set, process block 274 sets the main alarm flag. If the alarm flag has not been set, process block 276 clears the main alarm flag. The processor 22 in query block 278 determines whether any receiver diagnostic flags have been set. If the diagnostic flags have been set, the processor 22 sets the main receiver diagnostic flag in process block 280. If the receiver diagnostic flag has not been set, the processor 22 clears the main receiver diagnostic flag in process block 282.

Referring to FIG. 5b, the processor 22 determines in query block 284 whether the sensor diagnostic flag has been set. If the sensor diagnostic flag has been set, the processor 22 in process block 286 sets the main sensor diagnostic flag. Should query block 284 determine that the sensor diagnostic flag has not been set, the processor clears the main sensor diagnostic flag in process block 288.

In query block 290, the processor 22 determines whether the main alarm flag has been set. If the main alarm flag has been set, the processor 22 initiates a signal which allows the LED 206 to display a corresponding alarm in process block 292. At this point, the system cycles back to the poling routine in process block 270. Should query block 290 determine that the main alarm flag has not been set, the processor 22 in query block 294 determines whether the main receiver diagnostic flag has been set. If the main receiver diagnostic flag has been set, the processor in process block 296 displays a corresponding receiver fault and returns to the main menu in process block 270. Should the processor 22 determine in query block 294 that the main receiver diagnostic flag has not been set, the processor 22 in query block 298 will determine whether the main sensor diagnostic flag has been set. Should the processor 22 determine that the main sensor diagnostic flag has been set, it will display a corresponding sensor fault in process block 300 and return to the main menu in process block 270. Should the processor in query block 298 determine that the main sensor diagnostic flag has not been set, the processor will clear the display and go the main menu in process block 270.

FIGS. 8a–8i and 8j–8m represent voltage versus time plots for several places within the TPMS system 10 for diagnostic and alarm conditions respectively. Trace 8a describes the situation of pin 1 of U1A when the rolling switch has been closed for twenty minutes such as when the car has been parked with the ignition off and capacitor C1 has been allowed to discharge through resistors R1 and R2. Upon the closing of rolling switch, trace 8b shows that pin 1 of U1A gives a waveform spike. Trace 8c shows that pin 3 of U1A creates a square wave and is shown on trace 8d. Pin 5 of U1B creates a short pulse waveform.

At this time, pin 3 of U2A, which is initially high, is dropped to zero for 2–2.5 seconds. During this time, an output diagnostic signal has been generated. Pin 11 of U2D, as is seen in trace 8f, gives a duty cycle of the output sensor. Trace 8g shows pin 13 of U1D where C7 and R9 give short pulses during the pulses off of pin 11 of U2D. Trace 8 h shows that pin 4 of U2B produces a signal of 32 Khz only during the 2–2.5 seconds of the diagnostic signal. Trace 8i shows that pin 11 of U1D creates the output pulses by combining the duty cycle of pin 11 of U2D with the high frequency generated by pin 4 of U2B to create the diagnostic signal.

Traces 8j–8n describe the alarm system when the car is moving of velocities of greater than 20 kilometers per hour and the pressure switch indicates that there is low pressure. Pin 5 of U1B has a logical "I" at time, and pin 3 of U2A will have a logical "0". As can be seen in traces 8k, 8i, and 8m, the signals are combined to produce the alarm output as shown in trace 8n. As can be seen, a series of 32 Khz pulses having a 2.5 millisecond duration, each 18 milliseconds apart, is produced during an alarm condition. These signals are received by the processor 22 of receiver indicator module 21 and recognized during the interroutine 270.

Figure 9:
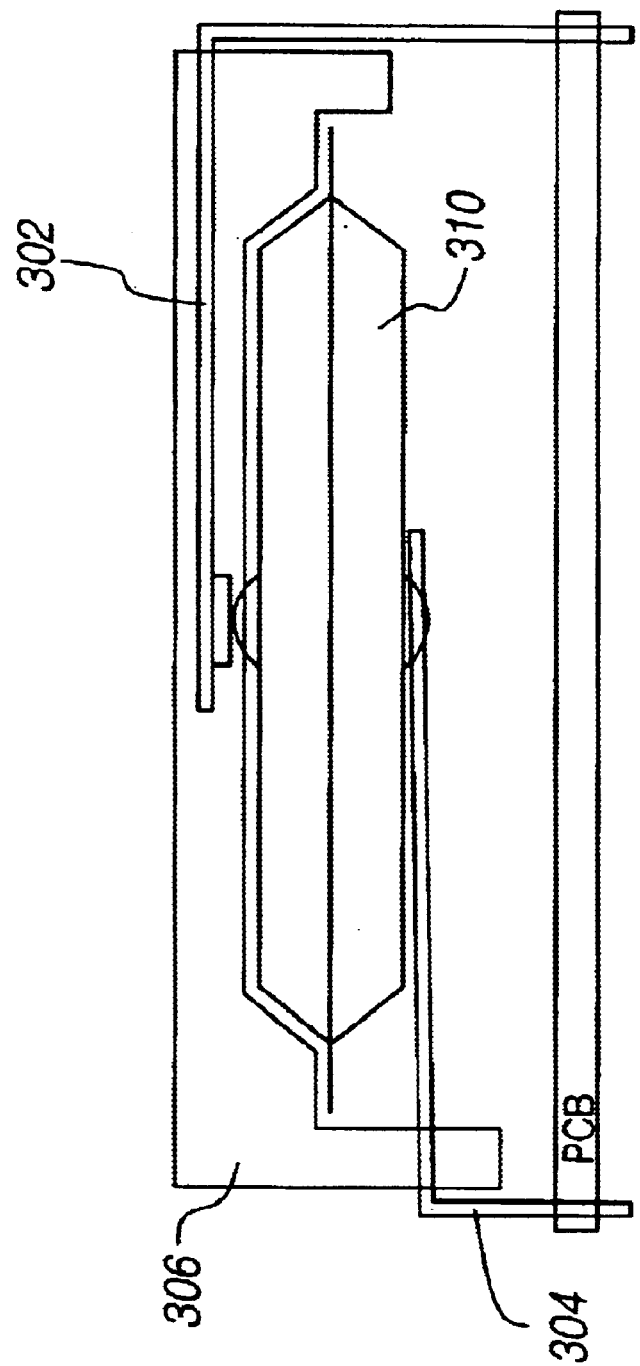
FIG. 9 depicts a sensor according to the teachings of the present invention.

FIG. 9 represents a side view of an active sensor 14 according to another embodiment of the invention. Shown is a pressure diaphragm 300 encased by a polymer inductor bobbin 306. Further integrated into the inductor bobbin 306 is switch contact 304 and alarm contact 302. The inductor bobbin 306 is used to hold inductor L1 of the active sensor 142.

The pressure diaphragm 300 is a hermetically sealed metal diaphragm, which is used on one of the active sensor's two electrical contacts. The pressure diaphragm 300 is constructed of stainless steel of varying gauges (0.125 mm, 0.15 mm, 0.20 mm, 0.25 mm). The gauge used in the pressure diaphragm 300 is dependent on the pressures the sensor switch is to be used for. The thicker the material, the higher pressure the pressure diaphragm 300 can withstand.

The dynamic properties of the pressure diaphragm 300 in the active sensor 142 are dictated by Young's Modulus of the material and by the spatial relationships of the pressure diaphragm 300 to the alarm terminal 302. The terminal 302 and switch contact 304 are held rigidly in place by the bobbin plastic 306. The switch contact 304 is fabricated from nickel-plated spring steel and will flex to allow for different gauges of pressure diaphragm material to be used in the assembly, as the pressure application requires.

Before the pressure diaphragm 300 is installed, it is exposed to a specific air pressure that is greater than the application pressure in order to compress it to a predetermined state. The pressure applied is determined by the desired alarm point for the application and by the material thickness of the pressure diaphragm. The for any specific pressure diaphragm the greater the pressure it is pre-exposed to, the lower the tire pressure alarm point, thus the switch can be calibrated to activate at any desired pressure. When this initial pressure is removed the switch will retain the desired state thus setting up a specific distance between the pressure diaphragm 300 and the alarm contact 806 when the proper tire pressure is applied.

As tire pressure drops, the diaphragm will expand toward the alarm contact until they make contact at a specific pressure alarm point. This contact triggers the electronics in the sensor to send a low-pressure alarm. As the pressure further drops towards 0 PSI the diaphragm will continue to expand while in contact with the alarm terminal. To relive the contact force caused by the increasing interference of the diaphragm and the alarm contact, the switch contact will spring back and absorb this force, thus not causing any damage to the diaphragm, alarm terminal or plastic bobbin.

As pressure is again increased, the diaphragm will compress until the contact has been broken with the alarm terminal. This happens when the outer edges of the pressure diaphragm seat on the plastic bobbin. The pressure diaphragm is always forced toward the alarm contact by the switch contact spring (14 g of force), and when contact with the alarm terminal is broken the switch contact will accurately seat the pressure diaphragm on the plastic bobbin. The total amount that the pressure switch is compressed to is less than 0.2 mm, but because the pressure diaphragm is seated accurately and interference forces are absorbed by the switch contact, all spatial relationships remain precise and the alarm set point is accurate and controllable.

By integrating the alarm contact into the inductor bobbin 306, manufacturing tolerances can be improved over previous systems which place the alarm contact on an adjacent PC board. Referring to FIG. 9, the structure of each sensor transducer 14a will now be described according to a first preferred embodiment of the present invention, with it being understood that the sensor transducers 14a and 14b are identical in structure and function. The sensor transducer 14a is preferably mounted to an inner edge 30 of the tire 16a or on the rim of the tire 16a, further described herein, and consists of the circuit including an inductor 34, a capacitor 36, and a switching element 38 including a self-contained diaphragm 300, for controlling the opening and closing of a switch 42. The circuit shown in FIGS. 2a and 2b is passive in that it does not require a power source for operation. Rather, the inductor 34 and the capacitor 36 comprise a resonant LC contour that is rendered either conductive or non-conductive depending upon the actual pressure inside of the corresponding tire.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A tire pressure monitoring system for monitoring a pressure of at least one tire on a trailer connected to a vehicle and providing a signal to an occupant in the vehicle, said tire pressure monitoring system comprising:
   an sensor mounted relative to the at least one tire on the trailer, said sensor operable to sense tire pressure within the at least one tire; and
   a receiver indicator module mounted to the trailer at a location external of the tire and within proximity to said sensor, said receiver having a receiver indicator module and an indicator, said indicator module operable to generate a signal indicative of the tire pressure sensed by said sensor, said indicator being remote of the vehicle.

2. The tire pressure monitoring system as defined in claim 1 wherein said sensor includes a rolling switch, said rolling switch being operable to place the sensor in an active mode upon reaching a predetermined velocity.

3. The tire pressure monitoring system as defined in claim 1 wherein said sensor transmits an alarm signal when the tire pressure falls outside a predetermined parameter.

4. The tire pressure monitoring system as defined in claim 1 wherein said sensor is configured to provide both a diagnostic signal and alarm signal.

5. The tire pressure monitoring system as defined in claim 1 wherein said receiver is operable to receive a signal from said sensor having a signature indicative of a status of said sensor.

6. The tire pressure monitoring system as defined in claim 1 wherein said receiver indicator module includes a logic circuit operable to discriminate between a valid diagnostic signal and an alarm signal.

7. The tire pressure monitoring system as defined in claim 6 wherein said logic circuit discriminates between a valid diagnostic signal and an alarm signal by way of a programmable controller.

8. The tire pressure monitoring system as defined in claim 1 further comprising a plurality of actively powered sensors operable to sense tire pressure within a plurality of tires mounted on the trailer.

9. The tire pressure monitoring system as defined in claim 1 wherein said sensor is positioned relative to said receiver within a range of between about 50 centimeters to about 100 centimeters.

10. The tire pressure monitoring system as defined in claim 1 wherein said indicator is mounted on the trailer.

11. The tire pressure monitoring system as defined in claim 1 wherein said receiver indicator module and indicator is on a fender of the trainer and in view of the occupant.

12. A tire monitoring system for monitoring a physical parameter of at least one tire on a trailer connected to a vehicle having a reflective surface positioned to allow an occupant to view a portion of the trailer, said tire monitoring system comprising:
   a sensor mounted relative to the at least one tire of the trailer, said sensor operable to sense the physical parameter within the at least one tire;
   a receiver mounted to the trailer and at a location external of the tire and within proximity to said sensor, said receiver operable to generate a first signal indicative of the physical parameter sensed by said sensor; and
   a tire status indicator in communication with said receiver, said tire status indicator being remote from the vehicle and viewable by the occupant.

13. The tire monitoring system as defined in claim 12 further a comprising a processor and a plurality of receivers and sensors, and wherein said processor is operable to receive signals indicative of the physical parameter sensed by said plurality of sensors.

14. The tire monitoring system as defined in claim 13 comprising a receiver indicator module, said receiver indicator module incorporating said receiver, said processor and said indicator.

15. The tire monitoring system as defined in claim 12 wherein said sensor is operable to measure at least one of a tire pressure.

* * * * *